United States Patent
Xiong et al.

(10) Patent No.: US 10,632,620 B2
(45) Date of Patent: Apr. 28, 2020

(54) MOTION CONTROL METHOD AND ROBOT USING SAME

(71) Applicant: UBTECH Robotics Corp., Shenzhen (CN)

(72) Inventors: Youjun Xiong, Shenzhen (CN); Jiawen Hu, Shenzhen (CN); Gaobo Huang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 299 days.

(21) Appl. No.: 15/432,923

(22) Filed: Feb. 15, 2017

(65) Prior Publication Data
US 2018/0169862 A1    Jun. 21, 2018

(30) Foreign Application Priority Data

Dec. 16, 2016    (CN) .......................... 2016 1 1167525

(51) Int. Cl.
*B25J 9/16*    (2006.01)
(52) U.S. Cl.
CPC ............ *B25J 9/1664* (2013.01); *B25J 9/1602* (2013.01); *B25J 9/1607* (2013.01); *B25J 9/1679* (2013.01)

(58) Field of Classification Search
CPC . B25J 9/16; B25J 9/1602; B25J 9/1679; B25J 9/1664; B25J 9/1607; B25J 9/1697; G05B 19/4155; G05B 2219/40394
See application file for complete search history.

(56) References Cited

U.S. PATENT DOCUMENTS

| 9,981,381 B1* | 5/2018 | Nagarajan | B25J 9/1664 |
| 2004/0236467 A1* | 11/2004 | Sano | B25J 13/02 700/245 |
| 2014/0012416 A1* | 1/2014 | Negishi | B25J 9/1607 700/251 |
| 2014/0277719 A1* | 9/2014 | Kamiya | B25J 9/1669 700/253 |

FOREIGN PATENT DOCUMENTS

CN    105700481 A    6/2016

* cited by examiner

*Primary Examiner* — Rachid Bendidi

(57) ABSTRACT

A motion control method for a robot is disclosed. The robot includes a determining module, a merging module, and a controlling module. The determining module determines whether at least two motion tasks executed in an adjacent sequence satisfy a merging condition. The merging module merges the at least two motion tasks to a new motion task, when the merging condition is satisfied. The controlling module controls the robot to perform the new motion task.

4 Claims, 3 Drawing Sheets

Determining whether at least two motion tasks in an execution adjacent sequence satisfy a merging condition. — S101

Merging the at least two motion tasks into a new motion task. — S102

Controlling the robot to perform the new motion task. — S103

MOTION CONTROL METHOD AND ROBOT USING SAME

CROSS REFERENCE TO RELATED APPLICATIONS

This application claims priority to Chinese Patent Application No. 201611167525.X, filed Dec. 12, 2016, which is hereby incorporated by reference herein as if set forth in its entirety.

BACKGROUND

1. Technical Field

The present disclosure generally relates to robot technology, and particularly to a motion control method of a robot.

2. Description of Related Art

A robot performs action according to a plurality of motion commands. However, when one motion command is performed by the robot, a delay pause is generated between the one motion command and a next motion command. Thus, an incoherence problem is generated.

Therefore, a need exists in the industry to overcome the described problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
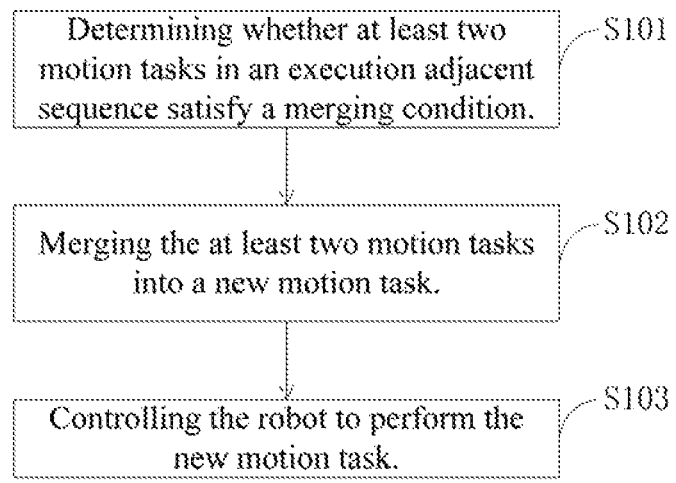
FIG. 1 is a flowchart of a motion control method of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same-embodiment, and such references can mean "at least one" embodiment.

FIG. 1 shows a flowchart of a motion control method of a robot according to one embodiment. The motion control method is performed by the robot to complete a plurality of motion tasks. The motion control method can merge two adjacent motion tasks to reduce a delay pause between the two adjacent motion tasks. Depending on the embodiment, additional steps may be added, others removed, and the ordering of the steps may be changed.

In step S101: Determining whether at least two motion tasks in an execution adjacent sequence satisfy a merging condition.

The at least two motion tasks in the adjacent execution sequence are analyzed to determine whether the motion tasks satisfy the merging condition. In the embodiment, the two adjacent motion tasks or three motion tasks in the adjacent execution sequence can be analyzed.

The plurality of motion tasks performed by the robot can be preset, input by a user, or generated by learning autonomously. The plurality of motion tasks are managed by a motion task list and performed by the robot in sequence.

The plurality of motion tasks can be performed in multiple sequences, such as setting a priority to each motion task and the motion task having a higher priority can be performed firstly; a first-in first-out manner which is the motion task written firstly and performed firstly; or a last-in first-out manner which is the motion task written last and performed firstly. In the embodiment, the preset motions tasks are performed in the first-in first-out manner; the motion tasks input by the user and generated by learning autonomously are set with a high priority and can be performed before the preset motion tasks.

The merging condition is set to ensure the robot move smoothly. In the embodiment, the merging condition is set as a same movement direction. That is, when the at least two motion tasks executed in an adjacent sequence have same movement direction Step S102 is performed.

Step S102: Merging the at least two motion tasks into a new motion task.

Step S103: Controlling the robot to execute the new motion task.

In step S102 the at least two motion tasks which are satisfied with the merging condition are merged into the new task. In the embodiment, the at least two motion tasks have the same movement direction, that is, when the robot completes a first motion task and continuously performs a second motion task in a same direction with the first motion task. In the step S103, the robot performs the new motion task to avoid a delay pause between the at least two motion tasks and ensure the robot move smoothly.

In the embodiment, the motion control method merges the at least two motion tasks into the new motion task, a delay pause is educed in the plurality of motion tasks and the robot can move smoothly. In the embodiment, the motion control method can merge the motion task before performing the motion task or merge the motion task when the motion task is performing.

Figure 2:
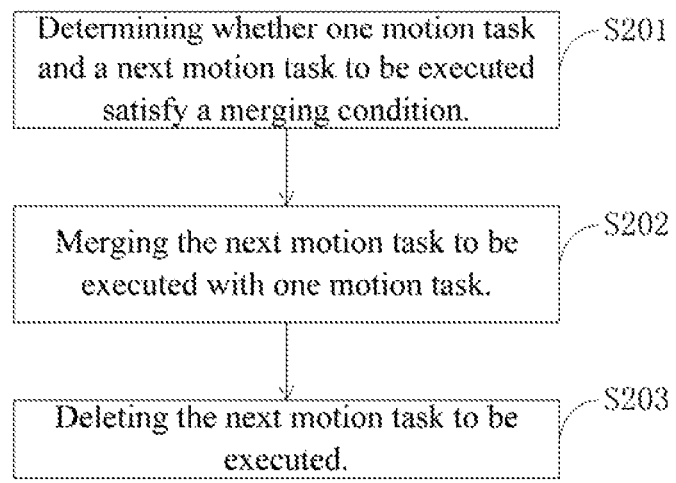
FIG. 2 is a flowchart of a motion control method of a robot according to another embodiment.

FIG. 2 shows a flowchart of a motion control method of a robot according to another embodiment. Depending on the embodiment, additional steps may be added, others removed, and the ordering of the steps may be changed.

Step S201: Determining whether a currently executed motion task and a next motion task to be executed satisfy a merging condition. In the embodiment, when the currently executed motion task and the next motion task to be executed have a same movement direction, step S202 is performed.

When currently executed motion task and the next motion task to be executed do not satisfy the merging condition, the currently executed motion task and the next motion task can't be merged and when the next motion is performing, step S201 is performed again.

Step S202: Merging the next motion task to be executed with the currently executed motion task.

Step S202: Updating the motion task in real-time, and the robot can perform the updated motion task.

Specially, step S202 can include a first merging manner and a second merging manner.

In the first merging manner, a current motion state and an execution status of the motion task are analyzed. A difference between a target distance and a moved distance of the currently executed motion task is calculated, and an uncompleted distance is obtained. The uncompleted distance is added into a target distance of the next motion task to be executed.

In the second merging manner, the currently executed motion task is replaced with the next motion task to be executed when the next motion task is received.

Take a linear motion as an example; if a target distance of the current motion task is 1 m along X direction, a target distance of the next motion task is 1 m along X direction. A moved distance 0.4 m is performed, and the uncompleted distance is 0.6 m along X direction.

In the first merging manner, the next motion task to be executed is added into the currently executed motion task, an updated target distance of the current motion task is 1.6 m. Thus, the robot can move smoothly 2 m along X direction.

In the second merging manner, a target distance of the currently executed motion task is 1 m. Thus, the robot can move smoothly 1.4 m along X direction.

Step S203; Deleting the next motion task to be executed. As the next motion task to be executed has been merged with the currently executed motion task, the next motion task is deleted in step S203.

The motion control method can be one or more programs stored in a storage. The one or more programs can include:

1. Determining whether at least two motion tasks in an adjacent execution sequence satisfy a merging condition.

2. Merging the at least two motion tasks into a new motion task, when the merging condition is satisfied.

3. Controlling the robot to perform the new motion task.

Figure 3:
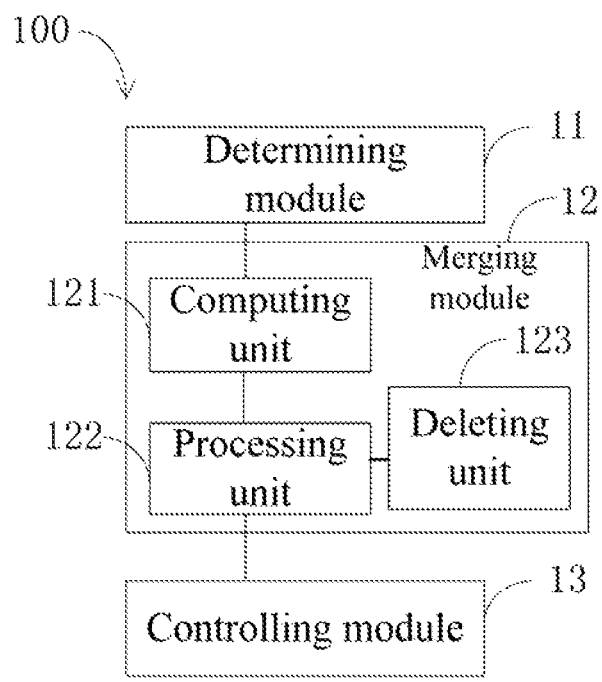
FIG. 3 is a diagrammatic drawing of a motion control system according to one embodiment.

FIG. 3 shows a diagrammatic drawing of a motion control system according to one embodiment. The motion control system may include a plurality of programs in the form of one or more computerized instructions executed by a processor the robot. In the embodiment, the motion control system can include a determining module 11, a merging module 12, and a control module 13. In general, the word "module", as used herein, refers to logic embodied in hardware or firmware, or to a collection of software instructions, written in a programming language, such as Java, C, or assembly. One or more software instructions in the units may be embedded in firmware, such as in an erasable programmable read only memory (EPROM). The units described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

The determining module 11 can determine whether at least two motion tasks executed in an adjacent sequence satisfy a merging condition. When the at least two motion tasks satisfy the merging condition, the merging module 12 can merge the at least two motion-tasks into a new motion task. The control module 13 controls the robot, to perform the new motion task.

When the determining module 11 determines the at least two motion tasks have a same movement direction, the merging condition is satisfied.

In another embodiment, the merging module 12 can include a computing unit 121, a processing unit 122, and a deleting unit 123.

When the determining module 11 determines the currently executed motion task and a next motion task to be executed satisfy the merging condition, the computing unit 121 calculates a difference between a target distance and a moved distance of the currently executed motion task to obtain an uncompleted distance.

The processing unit 122 can process the currently executed motion task and next motion task in the first merging manner or the second merging manner. In the first merging manner, the uncompleted distance is added into a target distance of the next motion task to be executed. In the second merging manner, the currently executed motion task is replaced with the next motion task to be executed when the next motion task is received. The processing unit 122 can merge the next motion task into the currently executed motion task via the first merging manner or the second merging manner.

The deleting unit 123 can delete the next motion task.

Figure 4:
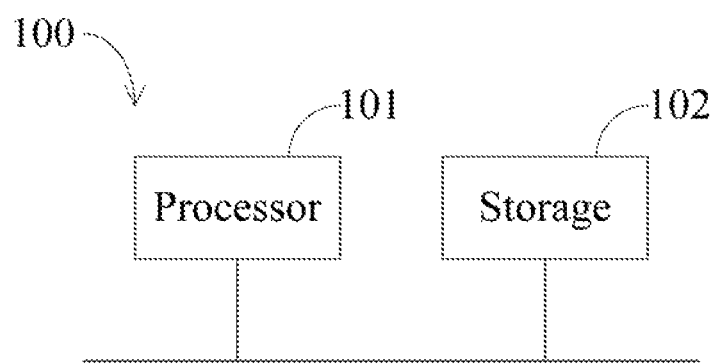
FIG. 4 is a hardware diagrammatic drawing of the motion control system of FIG. 3.

FIG. 4 shows a hardware diagrammatic drawing of the motion control system of FIG. 3. The motion control system 100 can be stored in a storage 102 and performed by a processor 101.

The storage 102 can store a plurality of motion tasks having a performing sequence. The processor 101 reads the plurality of motion tasks from the storage 102. The processor 101 controls the robot to perform the plurality of motion tasks. The processor 101 analyzes and processes the plurality of motion tasks to ensure the robot perform the motion tasks smoothly.

Specifically, the processor 101 performs the motion control method to determine whether at least two motion tasks executed in an adjacent sequence satisfy a merging condition. When the at least two motion tasks satisfy the merging condition, the at least two motion tasks are merged to a new motion task. The robot is controlled to perform the new motion task.

Figure 5:
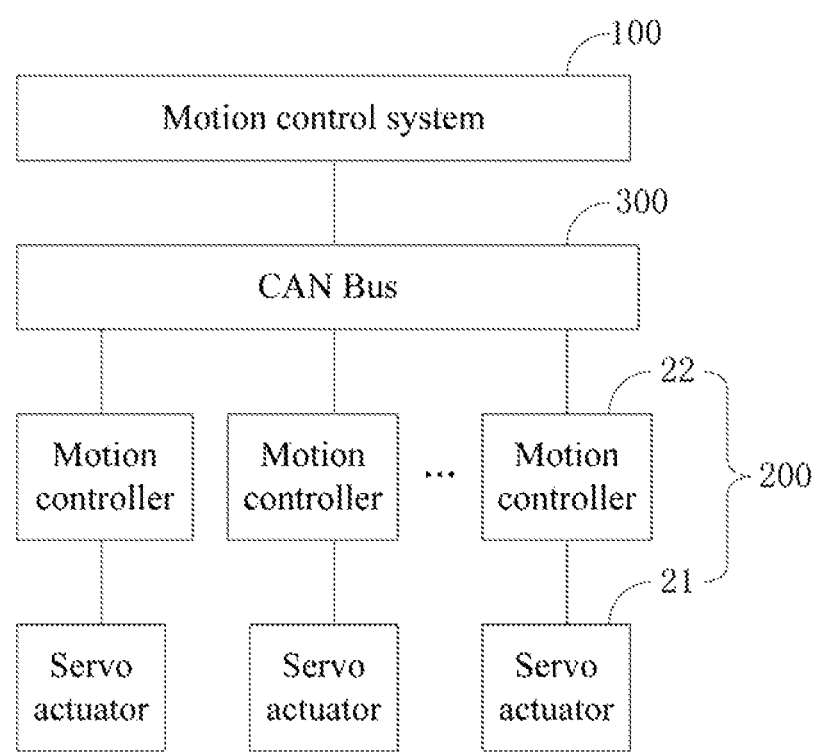
FIG. 5 is a diagrammatic drawing of a robot according to one embodiment.

FIG. 5 shows a diagrammatic drawing of a robot according to one embodiment. The robot 200 can include a plurality of parts, such as, a head, hands, trunk, and feet, each part is driven by a servo actuator 21, i.e. a servo motor to move.

The robot 200 can further include a plurality of motion controllers 22. Each of the plurality of motion controllers 22 corresponds to one part of the robot. The motion controllers 22 can receive the motion tasks form the motion control system 100 to control the servo actuators, thus the robot can move.

The motion control system 100 can connect to the plurality of controllers 22 via a CAN bus 300.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A motion control method for a robot, comprising executing on a processor of the robot the steps of:
   determining whether at least two motion tasks executed in an adjacent sequence to move the robot have a same movement direction, wherein the at least two motion tasks comprises a motion task being currently executed and a motion task to be executed;
   merging the at least two motion tasks into a new motion task, when the at least two motion tasks have the same movement direction;

updating the motion task being currently executed to the new motion task in real-time, and moving the robot by executing the new motion task;

wherein the step of merging the at least two motion tasks into the new motion task, comprises:

calculating a difference between a target distance and a moved distance of the motion task being currently executed to obtain an uncompleted distance, and adding a target distance of the motion task to be executed to the uncompleted distance;

wherein the at least two motion tasks are managed by a motion task list in a motion control system of the robot, and the motion task to be executed comprises a preset motion task, a motion task input by a user, or a motion task generated by learning autonomously; and wherein the preset motions task is performed in the first-in first-out manner, and the motion task input by the user and the motion task generated by learning autonomously are set with a high priority and are performed before the preset motion task.

2. The motion control method of claim 1, wherein the step of merging the at least two motion tasks into the new motion task further comprises:

deleting the motion task to be executed.

3. A robot, comprising: a non-transitory storage and a processor, wherein the non-transitory storage comprises one or more computer programs that are executable by the processor, the one or more computer programs comprising:

a determining module comprising instructions for determining whether at least two motion tasks executed in an adjacent sequence to move the robot have a same movement direction, wherein the at least two motion tasks comprises a motion task being currently executed and a motion task to be executed;

a merging module comprising instructions for merging the at least two motion tasks to a new motion task, when the at least two motion tasks have the same movement direction;

a controlling module comprising instructions for updating the motion task being currently executed to the new motion task in real-time, and moving the robot by executing the new motion task;

wherein the merging module calculates a difference between a target distance and a moved distance of the motion task being currently executed to obtain an uncompleted distance, and adds a target distance of the motion task to be executed to the uncompleted distance;

wherein the at least two motion tasks are managed by a motion task list in a motion control system of the robot, and the motion task to be executed comprises a preset motion task, a motion task input by a user, or a motion task generated by learning autonomously; and wherein the preset motions task is performed in the first-in first-out manner, and the motion task input by the user and the motion task generated by learning autonomously are set with a high priority and are performed before the preset motion task.

4. The robot of claim 3, wherein the merging module further deletes the motion task to be executed.

* * * * *